US012789684B2

(12) United States Patent
Ryba et al.

(10) Patent No.: US 12,789,684 B2
(45) Date of Patent: Nov. 10, 2026

(54) SEAT ASSEMBLY

(71) Applicant: Lear Corporation, Southfield, MI (US)

(72) Inventors: Nicholas Ryba, Orion, MI (US); Nizar Freijy, Oxford, MI (US); Michael Modreski, Novi, MI (US); Salvatore Pagano, St. Clair Shores, MI (US); Liwen Chen, Livonia, MI (US); Robert Szybisty, West Bloomfield, MI (US)

(73) Assignee: Lear Corporation, Southfield, MI (US)

( * ) Notice: Subject to any disclaimer, the term of this patent is extended or adjusted under 35 U.S.C. 154(b) by 192 days.

(21) Appl. No.: 18/746,582

(22) Filed: Jun. 18, 2024

(65) Prior Publication Data

US 2025/0381896 A1 Dec. 18, 2025

(51) Int. Cl.

| | |
|---|---|
| ***B60N 2/68*** | (2006.01) |
| ***B60N 2/30*** | (2006.01) |
| ***B60N 2/42*** | (2006.01) |
| ***B60N 2/427*** | (2006.01) |

(52) U.S. Cl.

CPC ........... *B60N 2/686* (2013.01); *B60N 2/3031* (2013.01); *B60N 2/4228* (2013.01); *B60N 2/42709* (2013.01)

(58) Field of Classification Search

CPC .. B60N 2/42709; B60N 2/4228; B60N 2/686; B60N 2/206; B60N 2/3031

USPC .......... 297/216.14, 216.13, 378.12, 473, 483

See application file for complete search history.

(56) References Cited

U.S. PATENT DOCUMENTS

| | | | | | |
|---|---|---|---|---|---|
| 4,109,959 | A * | 8/1978 | Barecki | B60N 2/242 | 297/451.3 |
| 5,439,272 | A * | 8/1995 | Hallet | B60N 2/688 | 297/479 |
| 6,276,751 | B1 | 8/2001 | Ikarashi | | |
| 6,398,291 | B1 | 6/2002 | Reusswig | | |
| 7,401,852 | B2 | 7/2008 | Humer | | |
| 7,549,699 | B2 | 6/2009 | Humer | | |
| 7,845,712 | B2 | 12/2010 | Gordon | | |
| 8,439,448 | B2 * | 5/2013 | Murthy | B60N 2/065 | 297/473 |
| 9,931,999 | B2 | 4/2018 | Line | | |
| 2001/0038233 | A1 * | 11/2001 | Eklind | B60N 2/42736 | 297/216.13 |
| 2004/0239137 | A1 | 12/2004 | Buccinna | | |
| 2008/0143163 | A1 * | 6/2008 | Harth | B60N 2/309 | 297/378.12 |

FOREIGN PATENT DOCUMENTS

EP 1714827 A2 * 10/2006 ............. B60N 2/888

* cited by examiner

*Primary Examiner* — Milton Nelson, Jr.

(74) *Attorney, Agent, or Firm* — McGarry Bair PC

(57) ABSTRACT

A seat assembly, comprising: a seat frame; a seat base coupled to the seat frame; and a seat back coupled to the seat frame and including: a seat back frame; a recliner rotatably coupling the seat back frame with the seat frame; a back panel including: an upper section rigidly coupled to the seat back frame; and a lower section coupled to the seat back frame and configured to disengage the seat back frame to facilitate bending of the seat back frame to limit a force transfer from the seat back frame to the recliner.

20 Claims, 8 Drawing Sheets

SEAT ASSEMBLY

TECHNICAL FIELD

The present disclosure generally relates to seat assemblies, including seat assemblies that can, for example, be utilized in connection with vehicles.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and embodiments are not restricted to the precise form and configuration shown in the drawings or disclosed in the following detailed description. Exemplary illustrations are described in detail by referring to the drawings as follows:

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Figure 1:
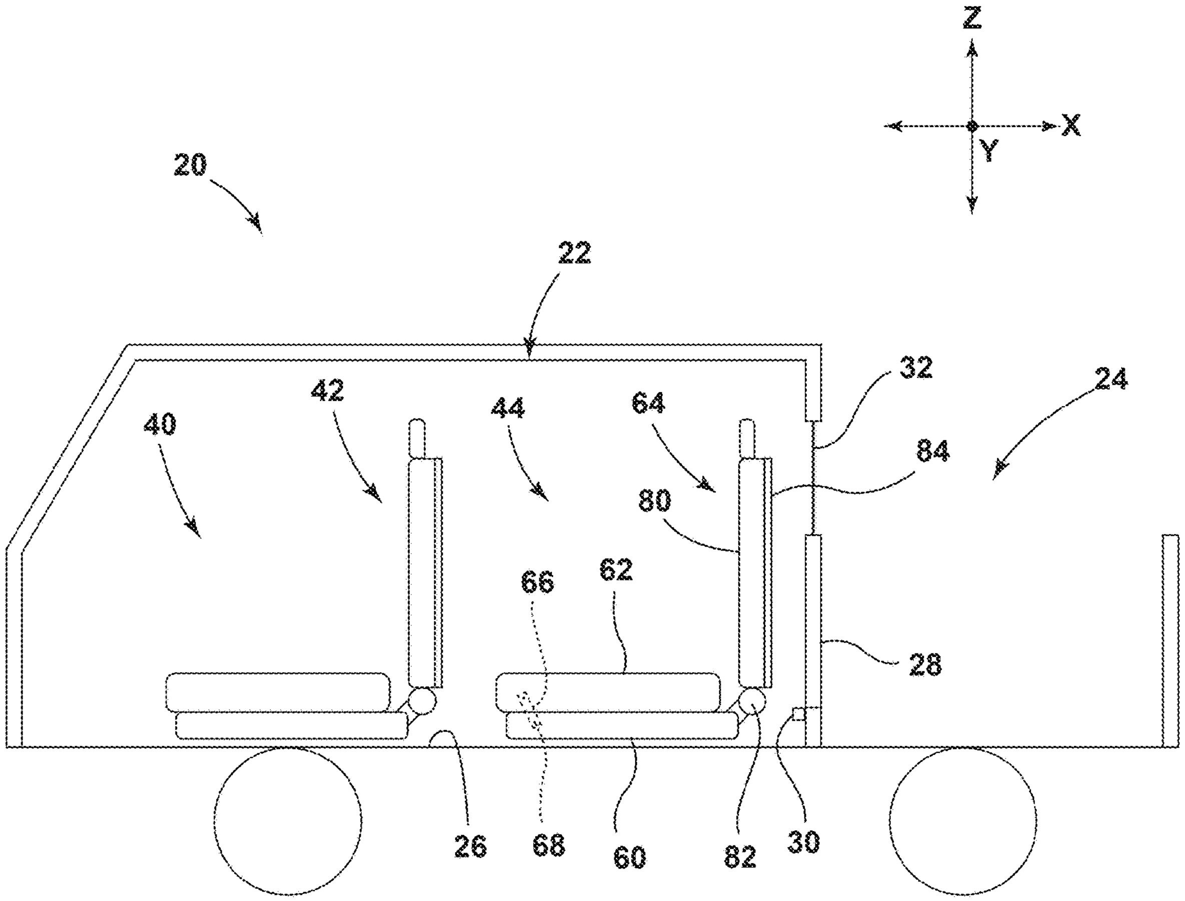
FIG. 1 is a schematic view generally illustrating an embodiment of a vehicle with a seat assembly according to teachings of the present disclosure.

Referring to FIG. 1, a vehicle 20 is illustrated with a vehicle cabin 22, a cargo bed 24, a mounting surface 26 (e.g., a floor or chassis), and a rear wall 28. The rear wall 28 separates the vehicle cabin 22 and the cargo bed 24. The rear wall 28 is rotatably coupled with the mounting surface 26, such as via a hinge 30. The rear wall 28 optionally includes a movable window 32. A seat assembly 40 is coupled (e.g., slidably) with the mounting surface 26 and is illustrated in the vehicle cabin 22. The vehicle 20 and/or the seat assembly 40 define a longitudinal direction X, a transverse direction Y, and a vertical direction Z. In at least some positions (e.g., in a design/seating position), the rear wall 28 is parallel to a Y-Z plane. The seat assembly 40 includes a front seat assembly 42 and a rear seat assembly 44 disposed closer to the rear wall 28 than the front seat assembly 42. The rear seat assembly 44 includes a seat frame 60, a first seat base 62 coupled to the seat frame 60, and a first seat back 64 coupled to the seat frame 60. The first seat back 64 includes a first seat back frame 80, a first recliner 82 rotatably coupling the first seat back frame 80 with the seat frame 60, and a first seat back panel 84 coupled to the first seat back frame 80. The first seat base 62 is rotatably coupled to the seat frame 60 via a rotating leg 66 that defines a rotation axis 68 at a front of the seat frame 60. The first seat base 62 is rotatable about the rotation axis 68, which is parallel to the transverse direction Y.

Figure 2:
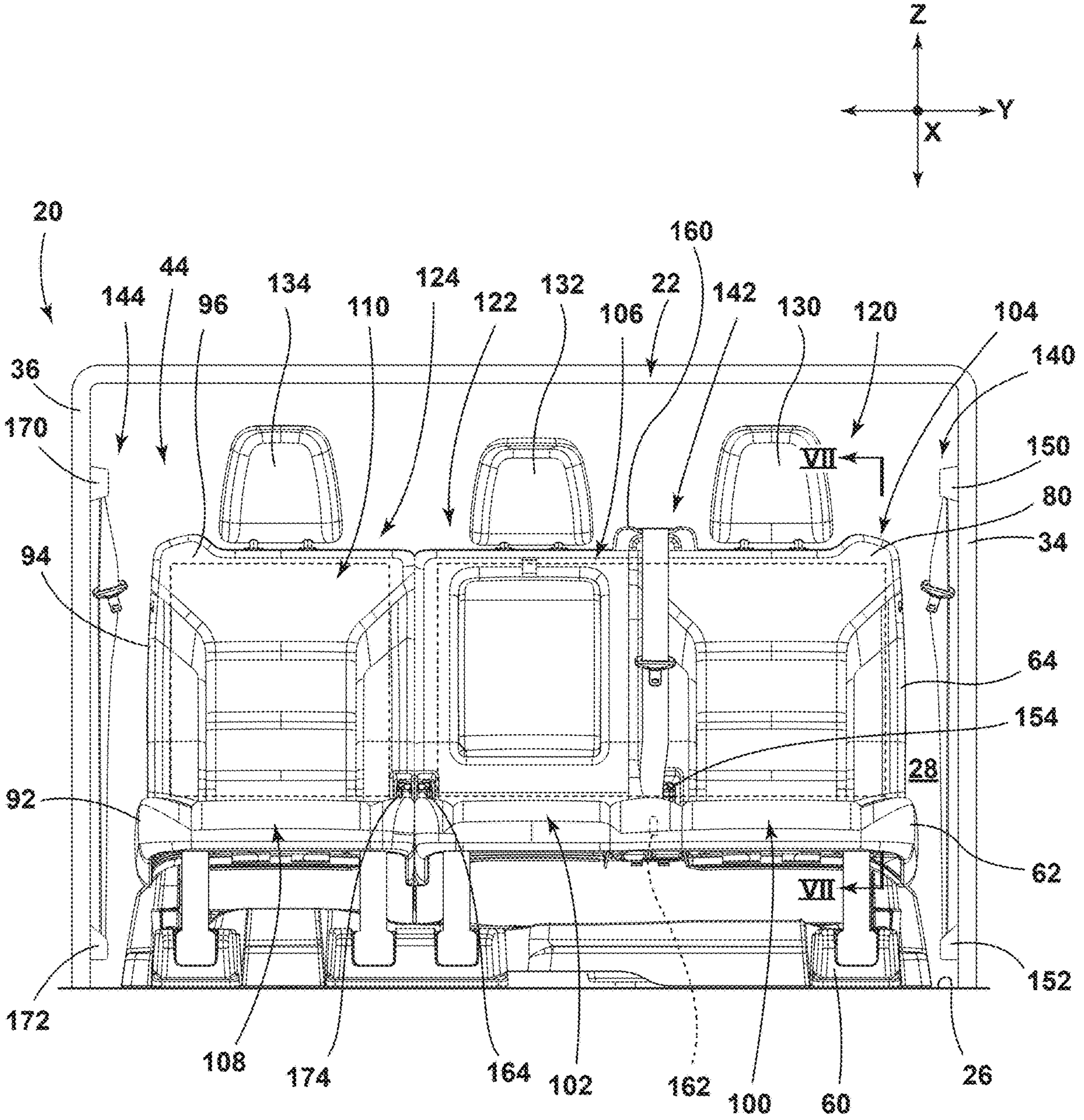
FIG. 2 is a front view generally illustrating an embodiment of a seat assembly of a vehicle according to teachings of the present disclosure.

Referring to FIG. 2, the vehicle 20 includes a first side wall 34 and a second side wall 36 that extend perpendicularly from the mounting surface 26 and that are perpendicular to the rear wall 28. The rear wall 28, the first side wall 34, and the second side wall 36 partially define the vehicle cabin 22. Optionally, the first side wall 34 and the second side wall 36 extend generally parallel to an X-Z plane.

Figure 3:
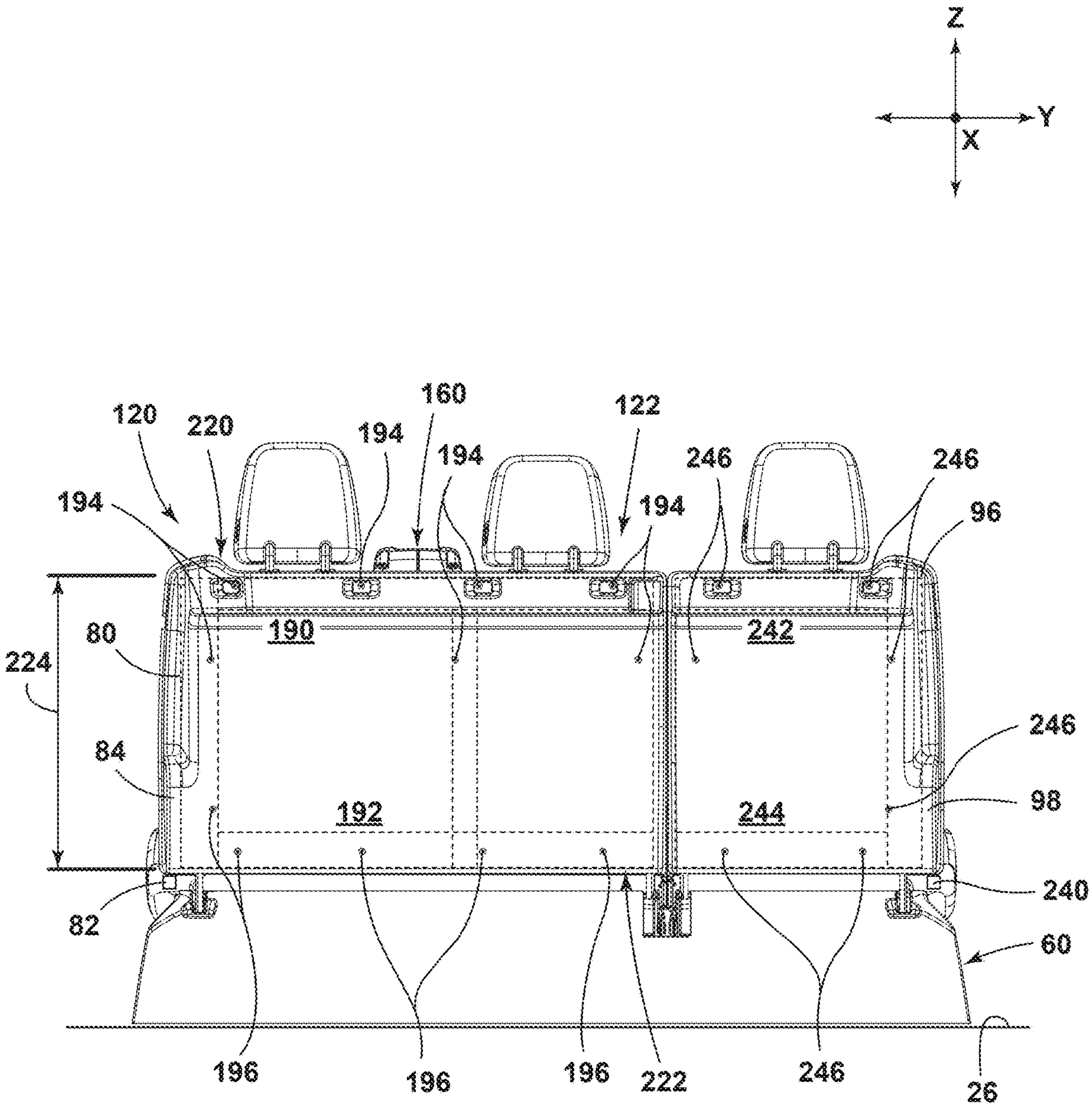
FIG. 3 is a rear view generally illustrating portions of an embodiment of seat assembly in a seating position according to teachings of the present disclosure.

The rear seat assembly 44 includes the first seat base 62, a second seat base 92 coupled to the seat frame 60, the first seat back 64, and a second seat back 94 coupled to the seat frame 60. The second seat back 94 includes a second seat back frame 96 and a second seat back panel 98 (FIG. 3). The first seat base 62 includes a first base seating section 100 and a second base seating section 102. The first seat back 64 includes a first back seating section 104 and a second back seating section 106. The second seat base 92 includes a third base seating section 108. The second seat back 94 includes a third back seating section 110. The first base seating section 100 and the first back seating section 104 define a first seat 120. The second base seating section 102 and the second back seating section 106 define a second seat 122. The third base seating section 108 and the third back seating section 110 define a third seat 124. The first seat 120 and the second seat 122 are integrated with each other. The third seat 124 moves independently of the first and second seats 120, 122 and can be moved to positions aligned with the first and second seats 120, 122. For example, the first, second, and third seats 120, 122, 124 are disposed in a split bench configuration. Optionally, the first and third seats 120, 124 are larger than the second seat 122, at least in the transverse direction Y (e.g., the first and third seats 120, 124 are wider than the second seat 122) and the first, second, and third seats 120, 122, 124 are disposed in a 60/40 split bench configuration with the first and second seats 120, 122 comprising 60% of the width of the rear seat assembly 44 and the third seat 124 comprising 40% of the width of the rear seat assembly 44.

The rear seat assembly 44 includes a first headrest 130 and a second headrest 132 coupled to a top of the first seat back frame 80, and includes a third headrest 134 coupled to a top of the second seat back frame 96. The rear seat assembly 44 includes a first seat belt assembly 140 for the first seat 120, a second seat belt assembly 142 for the second seat 122, and a third seat belt assembly 144 for the third seat 124. The first seat belt assembly 140 includes a first belt first portion 150

(e.g., a retractor) coupled the first side wall 34, a first belt second portion 152 (e.g., an anchor) coupled to the first side wall 34, and a first belt third portion 154 (e.g., a buckle) coupled to the seat frame 60. The second seat belt assembly 142 includes a second belt first portion 160 (e.g., a retractor) coupled a top of the first seat back frame 80, a second belt second portion 162 (e.g., an anchor) coupled to the seat frame 60, and a second belt third portion 164 (e.g., a buckle) coupled to the seat frame 60. Optionally, the second belt first portion 160 is disposed at least partially between the first headrest 130 and the second headrest 132. The third seat belt assembly 144 includes a third belt first portion 170 (e.g., a retractor) coupled the second side wall 36, a third belt second portion 172 (e.g., an anchor) coupled to the second side wall 36, and a third belt third portion 174 (e.g., a buckle) coupled to the seat frame 60.

Referring to FIG. 3, the first seat back panel 84 includes an upper section 190 and a lower section 192. The upper section 190 is coupled (e.g., rigidly fixed) to the first seat back frame 80. For example, the upper section 190 is bolted to the first seat back frame 80 via a plurality of bolts 194 (e.g., seven metal bolts). The lower section 192 is coupled to the first seat back frame 80 and configured to disengage the first seat back frame 80, at least under certain conditions. For example, the lower section 192 is coupled to the first seat back frame 80 by a plurality of plastic fasteners 196 (e.g., plastic push pins, plastic rivets, others). Optionally the plurality of plastic fasteners 196 comprises five plastic push pins. The upper section 190 includes a top 220 of the first seat back panel 84. The lower section 192 includes a bottom 222 of the first seat back panel 84. Optionally, the first seat back panel 84 includes a length 224 defined generally in the vertical direction Z, the upper section 190 comprises a first percentage of the length 224 (e.g., 30%-50%, such as 40%), and the lower section 192 comprises a second percentage of the length 224 (e.g., 20%-40%, such as 30%).

The second seat back frame 96 is rotatably coupled to the seat frame 60, such as via a second recliner 240. The second seat back panel 98 is coupled (e.g., rigidly fixed) to the second seat back frame 96. For example, upper and lower sections 242, 244 of the second seat back panel 98 are bolted to the second seat back frame 96 via a plurality of bolts 246 (e.g., seven metal bolts).

Figure 4:
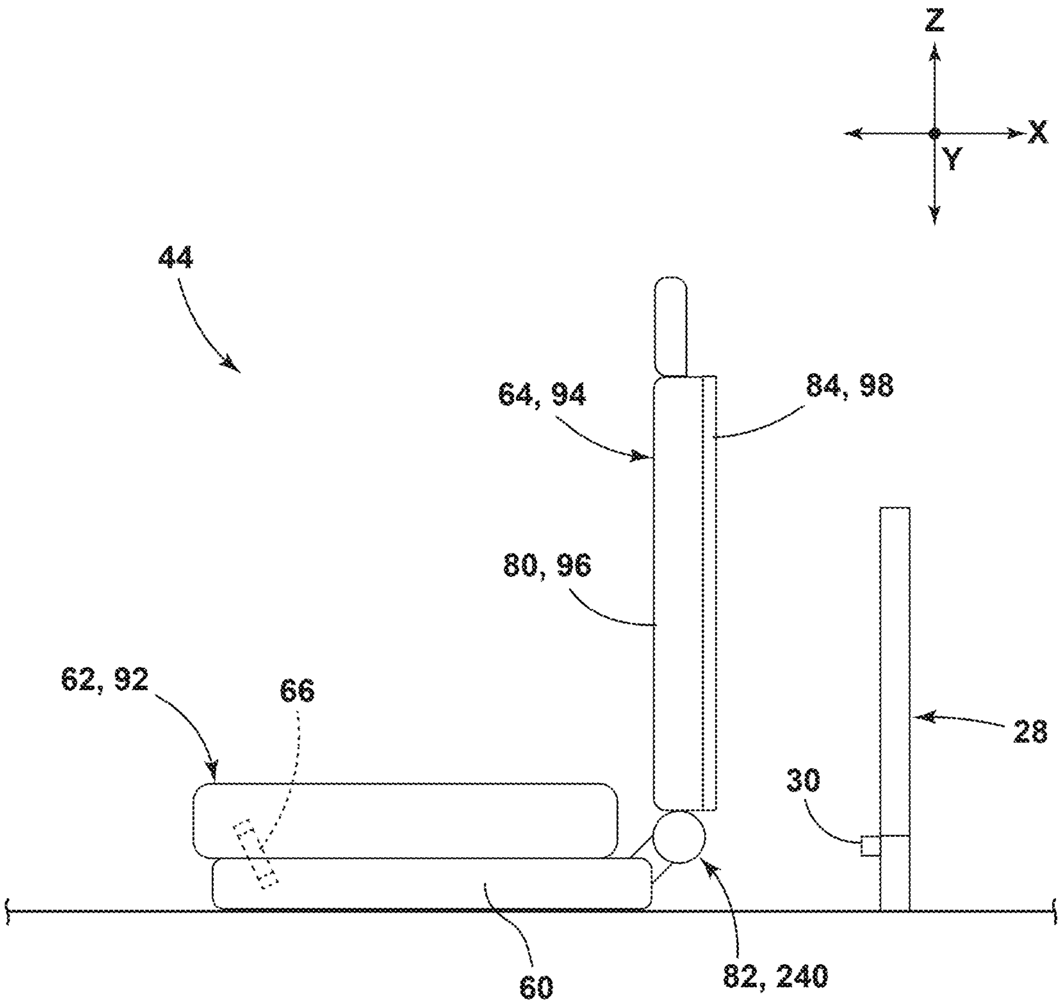
FIG. 4 is a schematic view generally illustrating portions of an embodiment of seat assembly and a vehicle rear wall in seating positions according to teachings of the present disclosure.
Figure 5:
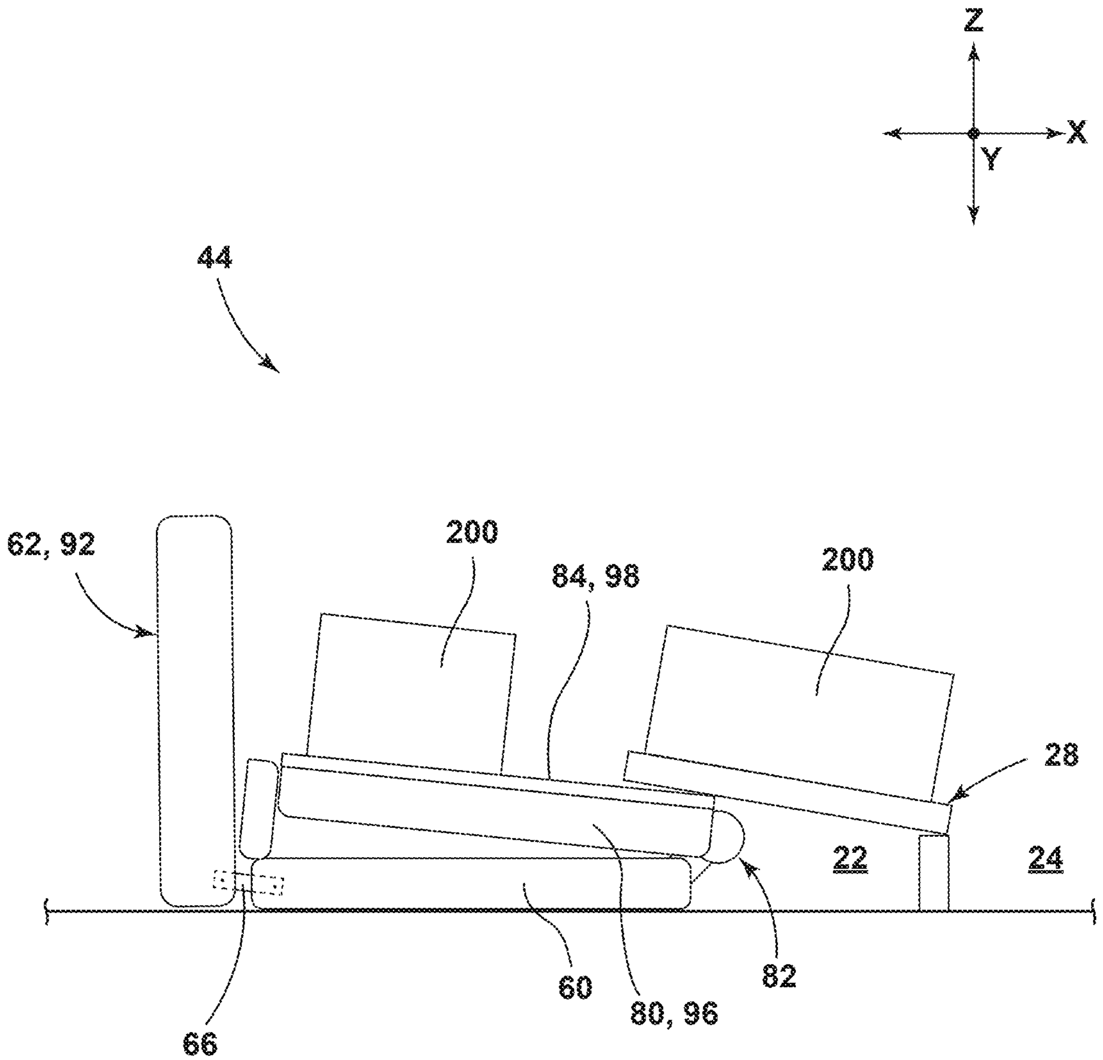
FIG. 5 is a schematic view generally illustrating portions of an embodiment of seat assembly and a vehicle rear wall in cargo positions according to teachings of the present disclosure.
Figure 6:
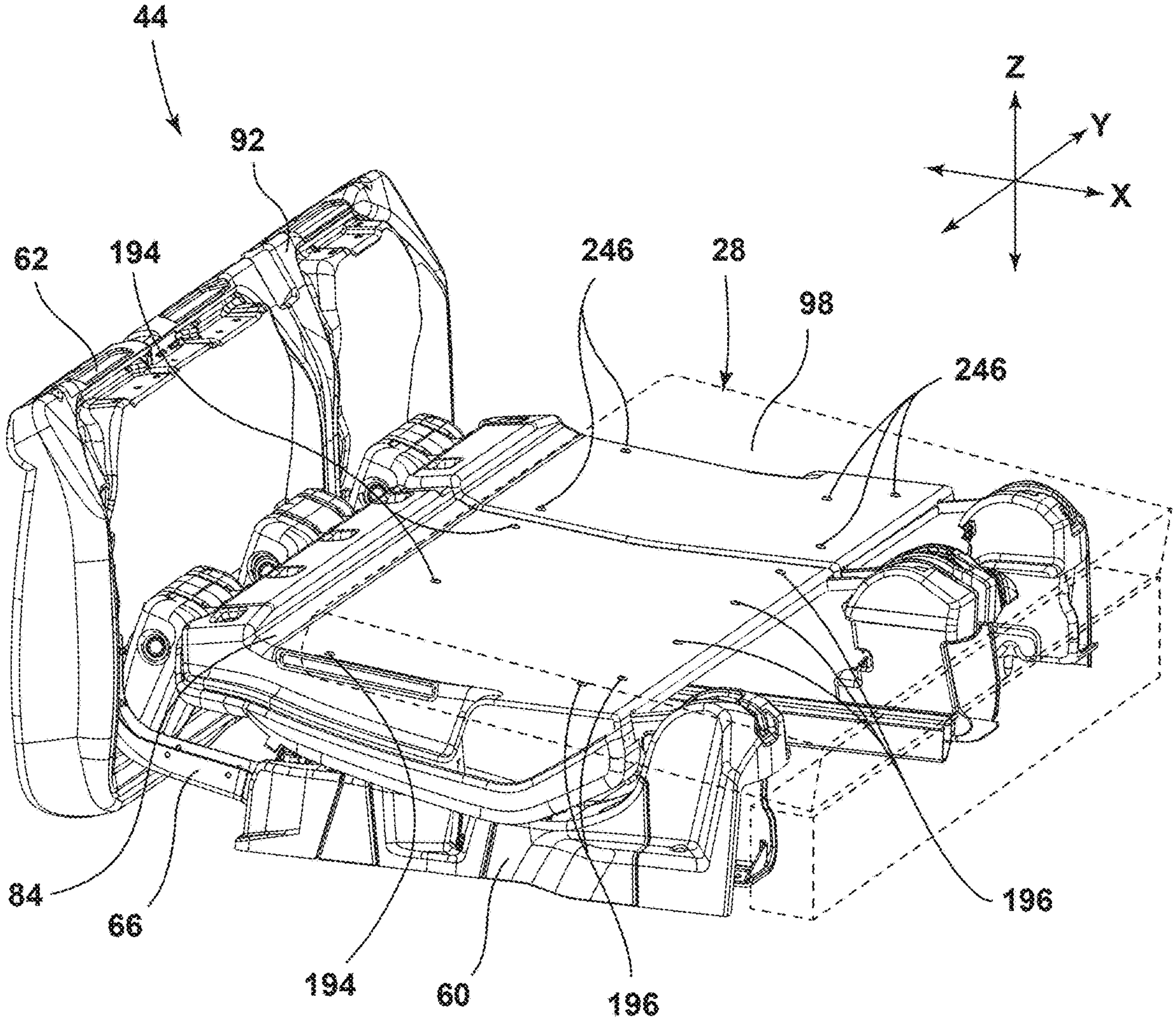
FIG. 6 is a perspective view generally illustrating portions of an embodiment of seat assembly and a vehicle rear wall in cargo positions according to teachings of the present disclosure.

Referring to FIGS. 4-6, the rear seat assembly 44 includes a plurality of rear seat assembly positions and the rear wall 28 includes a plurality of rear wall positions. The first and second seat bases 62, 92 include a first seat base seating position and a second seat base seating position, respectively, examples of which are generally illustrated in FIGS. 2 and 4, and first and second seat base cargo positions, which are generally illustrated in FIGS. 5 and 6. The first and second seat base seating positions include the first and second seat bases 62, 92 being substantially horizontal (e.g., within 30 degrees of horizontal, within 15 degrees of horizontal, etc.) such that an occupant could sit on the first and second seat bases 62, 92. The first and second seat base cargo positions include first and second seat bases 62, 92 being rotated forward relative to the first and second seat base seating positions and being substantially vertical (e.g., within 30 degrees of vertical, within 15 degrees of vertical, etc.). The first and second seat bases 62, 92 are independently coupled (e.g., rotatably coupled) to the seat frame 60 such that the first and second seat bases 62, 92 are movable relative to each other, so one of the first and second seat bases 62, 92 can be moved to and disposed in its seating position and the other can be moved to and disposed in its cargo position. With the first and second seat bases 62, 92 in the first and second seat base seating positions, respectively, the first and second seat bases 62, 92 are aligned with each other and are substantially horizontal. With the first and second seat bases 62, 92 in the first and second seat base cargo position, first and second seat bases 62, 92 are aligned with each other and are substantially vertical.

The first and second seat backs 64, 94 include a first seat back seating position and a second seat back seating position, respectively, examples of which are generally illustrated in FIGS. 2 and 4, and first and second seat back cargo positions, examples of which are generally illustrated in FIGS. 5 and 6. The first and second seat base seating positions include the first and second seat backs 64, 94 being substantially vertical (e.g., within 30 degrees of vertical, within 15 degrees of vertical, etc.) such that an occupant could lean their back again the first and second seat backs 64, 94. The first and second seat back cargo positions include first and second seat backs 64, 94 being rotated forward relative to the first and second seat back seating positions and being substantially horizontal (e.g., within 30 degrees of horizontal, within 15 degrees of horizontal, etc.). The first and second seat backs 64, 94 are movable relative to each other, so one of the first and second seat backs 64, 94 can be disposed in its seating position and the other can be disposed in its cargo position. With the first and second seat backs 64, 94 in the first and second seat back seating positions, respectively, the first and second seat backs 64, 94 back are aligned with each other and are substantially vertical. With the first and second seat backs 64, 94 in the first and second seat back cargo positions, respectively, the first and second seat backs 64, 94 are aligned with each other and are substantially horizontal.

Optionally, the first and second seat bases 62, 92 in the first and second seat base seating positions block movement of the first and second seat backs 64, 94 into the first and second seat back cargo positions, and the first and second seat bases 62, 92 in the first and second seat base cargo positions do not block movement of the first and second seat backs 64, 94 into the first and second seat back cargo positions.

The rear wall 28 includes a rear wall seating position, an example of which is illustrated in FIG. 4, and includes a rear wall cargo position, an example of which is illustrated in FIGS. 5 and 6. The rear wall seating position includes the rear wall 28 being substantially vertical and separating the vehicle cabin 22 from the cargo bed 24. In the rear wall seating position, the rear wall 28 is spaced from the rear seat assembly 44 such that use of the rear seat assembly 44 is unaffected by the rear wall 28. The rear wall cargo position includes the rear wall 28 being rotated forward relative to the rear wall seating position such that the rear wall 28 is substantially horizontal and is disposed on the rear seat assembly 44, such as on the first seat back panel 84 and/or the second seat back panel 98. The rear wall 28 is movable from the rear wall seating position to the rear wall cargo position with the first and second seat bases 62, 92 and the first and second seat backs 64, 94 in the cargo positions and/or when one or more other conditions are met. For example, in the seating positions of the first and second seat backs 64, 94, the first and second seat backs 64, 94 block movement of the rear wall 28 into the rear wall cargo position. In the rear wall cargo position, the rear wall 28 opens the vehicle cabin 22 to the cargo bed 24, effectively extending the cargo bed 24 into the vehicle cabin 22 to increase the cargo capacity of the cargo bed 24. Optionally, the rear wall 28 is a mid-gate.

With the rear wall 28 in the rear wall cargo position, cargo 200 can be stored on the rear wall 28, on the first seat back panel 84, and/or on the second seat back panel 98 (see FIG. 5). The first and second seat back panels 84, 98 are configured to resist damage from the cargo 200 being moved onto and stored on the first seat back panel 84 and the second seat back panel 98, and/or from contact with the rear wall 28. For example, the first and second seat back panels 84, 98 are rigid plastic back panels, which can include the first and second seat back panels 84, 98 having a tensile strength of at least 100 MPa. Optionally, the first and second seat back panels 84, 98 are compression molded, which can provide higher tensile strength than other formation methods, such as injection molding. For example, injection molded back panels may not include sufficient tensile strength to resist damage from the cargo 200 and/or the rear wall 28. Optionally, the first and second seat back panels 84, 98 are at least 3 mm (0.11 in) thick and less than or equal to 10 mm (0.4 in) thick, such as 4 mm (0.15 in) thick.

Figure 7:
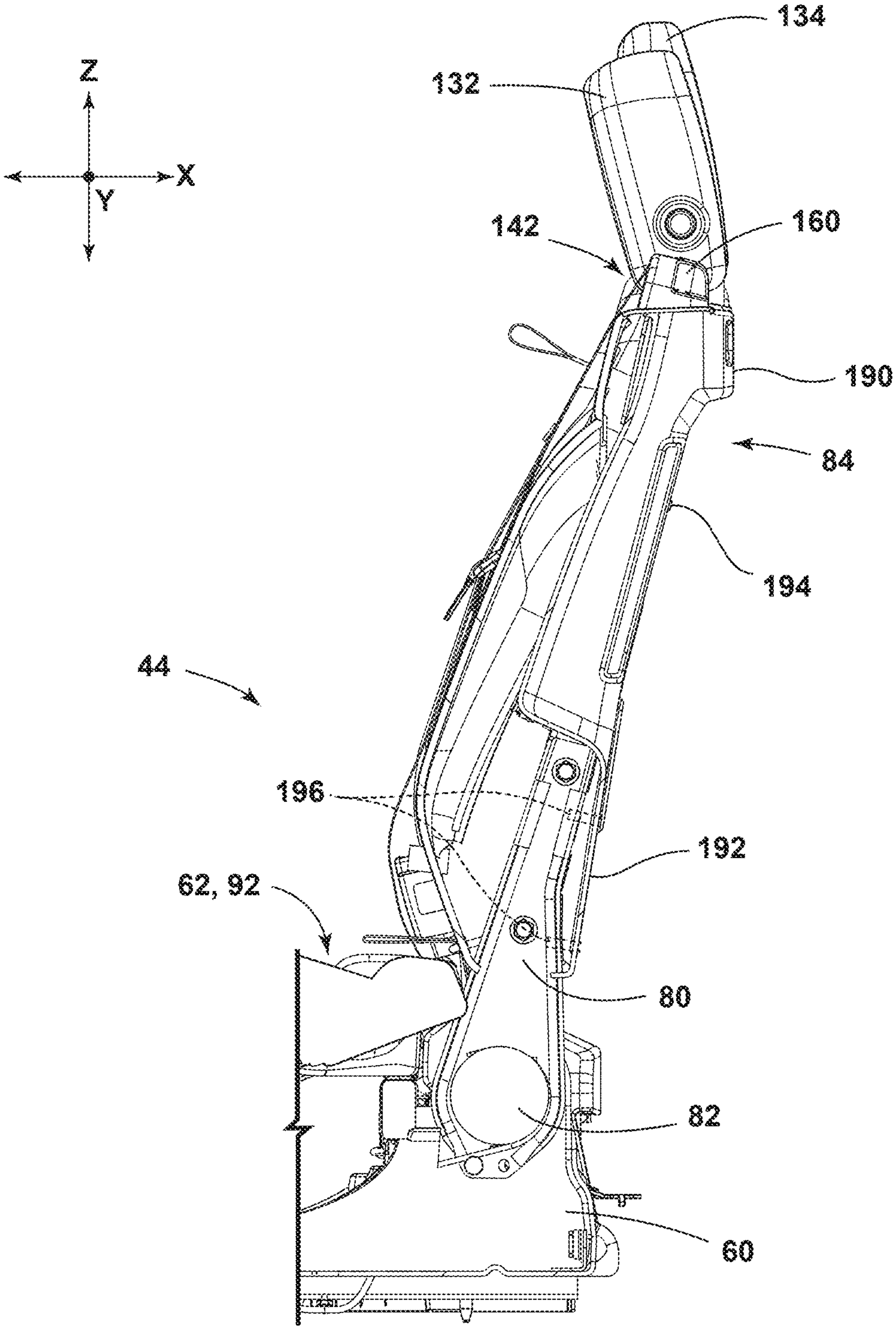
FIG. 7 is a cross-sectional view generally illustrating portions of an embodiment of seat assembly in a seating position according to teachings of the present disclosure.
Figure 8:
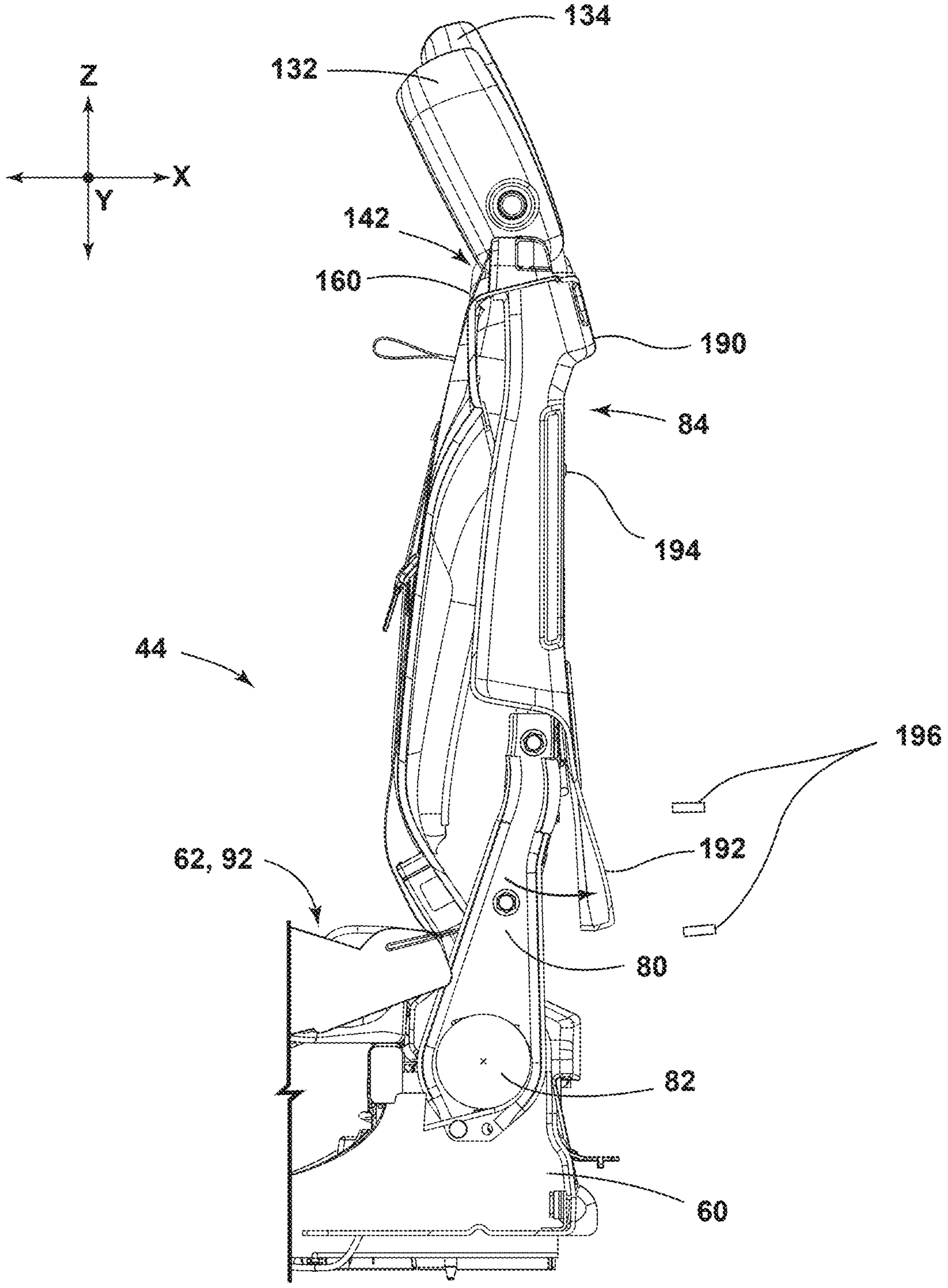
FIG. 8 is a cross-sectional view generally illustrating portions of an embodiment of seat assembly in a seating position with crash forces applied according to teachings of the present disclosure.

Referring to FIGS. 7 and 8, the plurality of plastic fasteners 196 that couple the lower section 192 to the first seat back frame 80 are configured to fix the lower section 192 to the first seat back frame 80 in certain conditions and to disengage at least one of the lower section 192 or the first seat back frame 80 in certain other conditions. For example, the plurality of plastic fasteners 196 are configured remain engaged with both of the lower section 192 and the first seat back frame 80 when a force applied to the first seat back frame 80 is below a force threshold, and are configured to disengage at least one of the lower section 192 of the first seat back frame 80 when the force applied to the first seat back frame 80 exceeds the force threshold. Optionally, the force is applied, at least in part, by an occupant of the second seat 122 (FIG. 2) being restrained by the second seat belt assembly 142 during a vehicle crash (e.g., a front end crash) and is applied generally forward in the X-direction at the top of the first seat back frame 80. For example, the occupant's mass/momentum causes the occupant to exert a pulling force on the second seat belt assembly 142, and at least some of that pulling force is transferred to the top of the first seat back frame 80 via the second belt first portion 160 of the second seat belt assembly 142. The pulling force transferred to the first seat back frame 80 is transferred, at least in part, to the first recliner 82. Disengagement of the plurality of plastic fasteners 196 from at least one of the first seat back frame 80 or the first seat back panel 84 includes deformation of the plurality of plastic fasteners 196. For example, the plurality of plastic fasteners 196 are configured to deform when the force applied to the first seat back frame 80 exceeds the force threshold.

The force threshold corresponds to (e.g., is less than or equal to) a maximum capacity of the first recliner 82 (e.g., a maximum force or torque capacity) such that the lower section 192 of the first seat back panel 84 is configured to disengage the first seat back frame 80 prior to the force transferred to the first recliner 82 from the first seat back frame 80 exceeding the maximum capacity of the first recliner 82. For example, the first seat back panel 84 increases the strength and/or rigidity of the first seat back frame 80 and limits bending of the first seat back frame 80 while engaged with the first seat back frame 80. Disengaging the lower section 192 from the first seat back frame 80 allows or facilitates bending of the first seat back frame 80 with forces that are below the maximum capacity of the first recliner 82. Bending of the first seat back frame 80 limits the force transfer (e.g., of the pulling forces) from the first seat back frame 80 to the first recliner 82. Bending of the first seat back frame 80 may be preferred to exceeding the capacity of the first recliner 82, such as to prevent the first recliner 82 from becoming inoperable and/or from releasing the first seat back frame 80. Optionally, the force threshold is high enough that the lower section 192 remains engaged with the first seat back frame 80 if the vehicle crash occurs with the second seat 122 unoccupied. For example, the force threshold can be higher than forces applied to the first seat back frame 80 corresponding to the weight of the first seat back 64, including the first seat back frame 80. In a non-limiting example, the capacity of the first recliner can be 4000 Nm. Optionally, some or all of the plastic fasteners 196 are configured to eject rearward from the first seat back frame 80 and the first seat back panel 84 in the event of a crash.

Referring again to FIG. 2, the third belt first portion 170 and the third belt second portion 172 of the third seat belt assembly 144 being coupled to the second side wall 36, as opposed to the second seat back frame 96 and the seat frame 60, respectively, limits the amount of force from an occupant of the third seat 124 that is transferred to the second seat back frame 96, which limits the force transferred to the second recliner 240 (FIG. 3). For example, during a front end vehicle crash, an occupant of the third seat 124 may apply little or no forward force to the top of the second seat back frame 96, so the forces transferred to the second recliner 240 may be below a maximum capacity of the second recliner 240 such that bending of the second seat back frame 96 to limit such force transfer may not be desired and/or beneficial. With such a configuration, increased rigidity and/or strength provided by the second seat back panel 98 (FIG. 3) to the second seat back frame 96 limiting bending of the second seat back frame 96 may be acceptable, and the second seat back panel 98 (FIG. 3) may be configured not to disengage the second seat back frame 96, and/or the forces applied to the second seat back frame 96 may not be expected to rise to the threshold.

Vehicles and seat assemblies disclosed herein can include one or more advantages relative to other designs. For example, seat assemblies with the disclosed seat back panels can be utilized for storing cargo thereon and can be resistant to damage from such cargo and/or from the rear wall (and cargo thereon), while also facilitating limiting a transfer of force to a recliner. The instant disclosure includes the following non-limiting embodiments:

A seat assembly, comprising: a seat frame; a seat base coupled to the seat frame; and a seat back coupled to the seat frame and including: a seat back frame; a recliner rotatably coupling the seat back frame with the seat frame; a back panel including: an upper section rigidly coupled to the seat back frame; and a lower section coupled to the seat back frame and configured to disengage the seat back frame to facilitate bending of the seat back frame to limit a force transfer from the seat back frame to the recliner.

The seat assembly of any preceding embodiment, further comprising a seat belt assembly including a first portion coupled to a top of the seat back frame.

The seat assembly of any preceding embodiment, further comprising a first headrest coupled to the seat back frame, and a second headrest coupled to the seat back frame; and wherein the first portion of the seat belt assembly is disposed at least partially between the first headrest and the second headrest.

The seat assembly of any preceding embodiment, wherein the upper section is bolted to the seat back frame; and the lower section is coupled to the seat back frame via a plurality of plastic fasteners configured to disengage at least one of the back panel or the seat back frame when the force applied to the seat back frame exceeds a threshold.

The seat assembly of any preceding embodiment, wherein the plurality of plastic fasteners includes five plastic pins.

The seat assembly of any preceding embodiment, wherein the plurality of plastic fasteners are configured to disengage at least one of the back panel or the seat back frame when the force applied to the seat back frame exceeds the threshold to facilitate bending of the seat back frame to limit the force transfer to the recliner.

The seat assembly of any preceding embodiment, wherein the back panel is compression molded.

The seat assembly of any preceding embodiment, wherein the back panel is a rigid plastic back panel.

The seat assembly of any preceding embodiment, wherein a tensile strength of the back panel is at least 100 MPa.

The seat assembly of any preceding embodiment, wherein the back panel has a thickness of at least 3 mm and less than or equal to 10 mm.

The seat assembly of any preceding embodiment, wherein the seat base is a first seat base including a first base seating section and a second base seating section; the seat back is a first seat back including a first back seating section and a second back seating section; the seat assembly further comprises a second seat base and a second seat back; the second seat base includes a third base seating section; the second seat back includes a third back seating section; and the first base seating section and the first back seating section define a first seat; the second base seating section and the second back seating section define a second seat; the third base seating section and the third back seating section define a third seat; and the first seat, the second seat, and the third seat are disposed in a split bench configuration.

The seat assembly of any preceding embodiment, wherein the first seat base and the second seat base are independently rotatably coupled with the seat frame such that the first seat base is movable between a first seat base seating position and a first seat base cargo position, and the second seat base is movable between a second seat base seating position and a second seat base cargo position; with the first seat base in the first seat base seating position and the second seat base in the second seat base seating position, the first seat base and the second seat base are aligned with each other and are substantially horizontal; and with the first seat base in the first seat base cargo position and the second seat base in the second seat base cargo position, the first seat base and the second seat base are aligned with each other and are substantially vertical.

The seat assembly of any preceding embodiment, wherein the first seat back and the second seat back are independently rotatably coupled with the seat frame such that the first seat back is movable between a first seat back seating position and a first seat back cargo position, and the second seat back is movable between a second seat back seating position and a second seat back cargo position; with the first seat back in the first seat back seating position and the second seat back in the second seat back seating position, the first seat back and the second seat back are aligned with each other and are substantially vertical; and with the first seat back in the first seat back cargo position and the second seat back in the second seat back cargo position, the first seat back and the second seat back are aligned with each other and are substantially horizontal.

The seat assembly of any preceding embodiment, wherein the second seat back includes a second seat back frame and a second seat back panel including a second seat back panel upper section and a second seat back panel lower section; and the second seat back panel upper section and the second seat back panel lower section are rigidly coupled to the second seat back frame.

The seat assembly of any preceding embodiment, wherein the second seat back panel upper section and the second seat back panel lower section are bolted to the second seat back frame.

A vehicle, comprising: a mounting surface; a rear wall rotatably coupled to the mounting surface and including a rear wall seating position and a rear wall cargo position, the rear wall partially defining a vehicle cabin and cargo bed in the rear wall seating position; and the seat assembly of any preceding embodiment coupled to the mounting surface.

The vehicle of any preceding embodiment, wherein, with the rear wall in the rear wall cargo position, the rear wall is disposed on the back panel.

The vehicle of any preceding embodiment, further comprising: a first side wall extending from the mounting surface; a second side wall extending from the mounting surface; a first seat belt assembly coupled to the first side wall; a second seat belt assembly including a first portion coupled to a top section of the seat back frame; and a third seat belt assembly coupled the second side wall.

The vehicle of any preceding embodiment, wherein the lower section is coupled to the seat back frame via a plurality of plastic fasteners configured to disengage at least one of the back panel or the seat back frame when a force applied to the seat back frame, at least in part via the first portion of the second seatbelt assembly, exceeds a threshold to limit the force transfer to the recliner.

The vehicle of any preceding embodiment, wherein the second base seating section and the second back seating section at least partially define a second seat; and the force applied to the seat back frame via the first portion of the second seat belt assembly corresponds to a mass of an occupant of the second seat.

The seat assembly of any preceding embodiment, wherein the upper section comprises 40% of a length of the back panel and includes a top of the back panel; and the lower section comprises 30% of the length of the back panel and includes a bottom of the back panel.

The seat assembly of any preceding embodiment, wherein the upper section and the lower section are coupled to the seat back frame via different fasteners.

The seat assembly of any preceding embodiment, wherein lower fasteners fastening the lower section to the seat back frame have a lower capacity than upper fasteners fastening the upper section to the seat back frame.

The seat assembly of any preceding embodiment, wherein lower fasteners fastening the lower section to the seat back frame are configured to deform and disengage at least one of the seat back frame and the seat back panel at a lower level of force than upper fasteners fastening the upper section to the seat back frame.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," "an embodiment," "with some configurations," "in some configurations," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," "an embodiment," "with some configurations," "in some configurations," or the like, in places throughout the specification are not necessarily all referring to the same embodiment. Furthermore, the particular features, structures, and/or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof. The word "exemplary" is used herein to mean "serving as a non-limiting example."

It should be understood that references to a single element are not necessarily so limited and may include one or more of such element, unless the context clearly indicates otherwise. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

"One or more" includes a function being performed by one element, a function being performed by more than one element, e.g., in a distributed fashion, several functions being performed by one element, several functions being performed by several elements, or any combination of the above. The term "at least one of" in the context of, e.g., "at least one of A, B, and C" or "at least one of A, B, or C" includes only A, only B, only C, or any combination or subset of A, B, and C, including any combination or subset of one or a plurality of A, one or a plurality of B, and one or a plurality of C.

Although the terms first, second, etc. are, in some instances, used herein to describe various elements, these elements should not be limited by these terms. These terms are only used to distinguish one element from another. For example, a first element could be termed a second element, and, similarly, a second element could be termed a first element, without departing from the scope of the various described embodiments. The first element and the second element are both elements, but they are not the same element.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. The term "and/or" as used herein refers to and encompasses any and all possible combinations of one or more of the associated listed items. Uses of "and" and "or" are to be construed broadly (e.g., to be treated as "and/or"). For example and without limitation, uses of "and" do not necessarily require all elements or features listed, and uses of "or" are inclusive unless such a construction would be illogical. The terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Joinder references (e.g., attached, coupled, connected, and the like) are to be construed broadly and may include intermediate members between a connection of elements, relative movement between elements, direct connections, indirect connections, fixed connections, movable connections, operative connections, indirect contact, and/or direct contact. As such, joinder references do not necessarily imply that two elements are directly connected/coupled and in fixed relation to each other. Connections of electrical components, if any, may include mechanical connections, electrical connections, wired connections, and/or wireless connections, among others. Uses of "e.g." and "such as" in the specification are to be construed broadly and are used to provide non-limiting examples of embodiments of the disclosure, and the disclosure is not limited to such examples.

While processes, systems, and methods may be described herein in connection with one or more steps in a particular sequence, such methods may be practiced with the steps in a different order, with certain steps performed simultaneously, with additional steps, and/or with certain described steps omitted.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

All matter contained in the above description or shown in the accompanying drawings shall be interpreted as illustrative only and not limiting. Changes in detail or structure may be made without departing from the present disclosure.

What is claimed is:

1. A seat assembly, comprising:
- a seat frame;
- a seat base coupled to the seat frame; and
- a seat back coupled to the seat frame and comprising:
  - a seat back frame;
  - a recliner rotatably coupling the seat back frame with the seat frame; and
  - a back panel comprising:
    - an upper section rigidly coupled to the seat back frame; and
    - a lower section coupled to the seat back frame via a plurality of fasteners, the plurality of fasteners configured to deform and disengage from the seat back frame based on a force applied to the seat back frame.

2. The seat assembly of claim 1, further comprising a seat belt assembly including a first portion coupled to a top of the seat back frame.

3. The seat assembly of claim 2, further comprising a first headrest coupled to the seat back frame, and a second headrest coupled to the seat back frame; and wherein the first portion of the seat belt assembly is disposed at least partially between the first headrest and the second headrest.

4. The seat assembly of claim 1, wherein the upper section is bolted to the seat back frame; and wherein the plurality of fasteners comprises a plurality of plastic fasteners.

5. The seat assembly of claim 1, wherein the plurality of fasteners comprises a plurality of plastic pins.

6. The seat assembly of claim 1, wherein the plurality of fasteners are configured to disengage from the seat back frame at a force threshold that corresponds to a maximum capacity of the recliner, such that disengagement occurs prior to a force exceeding the maximum capacity of the recliner, is transferred from the seat back frame to the recliner.

7. The seat assembly of claim 1, wherein the back panel is compression molded.

8. The seat assembly of claim 1, wherein the upper section is coupled to the seat back frame via a first plurality of fasteners, wherein the plurality of fasteners coupling the lower section to the seat back is a second plurality of fasteners different from the first plurality of fasteners.

9. The seat assembly of claim 1, wherein when a force applied to the seat back exceeds a predetermined threshold, the plurality of fasteners deform prior to disengaging from at least one of the seat back frame and the lower section.

10. The seat assembly of claim 1, wherein when a force applied to the seat back is less than a predetermined threshold, the plurality of fasteners are configured to remain engaged with both the lower section and the seat back frame.

11. The seat assembly of claim 1, wherein the seat base is a first seat base including a first base seating section and a second base seating section;

the seat back is a first seat back including a first back seating section and a second back seating section;

the seat assembly further comprises a second seat base and a second seat back;

the second seat base includes a third base seating section;

the second seat back includes a third back seating section;

the first base seating section and the first back seating section define a first seat;

the second base seating section and the second back seating section define a second seat;

the third base seating section and the third back seating section define a third seat; and the first seat, the second seat, and the third seat are disposed in a split bench configuration.

12. The seat assembly of claim 11, wherein the first seat base and the second seat base are independently rotatably coupled with the seat frame such that the first seat base is movable between a first seat base seating position and a first seat base cargo position, and the second seat base is movable between a second seat base seating position and a second seat base cargo position;

with the first seat base in the first seat base seating position and the second seat base in the second seat base seating position, the first seat base and the second seat base are aligned with each other and are substantially horizontal; and with the first seat base in the first seat base cargo position and the second seat base in the second seat base cargo position, the first seat base and the second seat base are aligned with each other and are substantially vertical.

13. The seat assembly of claim 12, wherein the first seat back and the second seat back are independently rotatably coupled with the seat frame such that the first seat back is movable between a first seat back seating position and a first seat back cargo position, and the second seat back is movable between a second seat back seating position and a second seat back cargo position;

with the first seat back in the first seat back seating position and the second seat back in the second seat back seating position, the first seat back and the second seat back are aligned with each other and are substantially vertical; and with the first seat back in the first seat back cargo position and the second seat back in the second seat back cargo position, the first seat back and the second seat back are aligned with each other and are substantially horizontal.

14. The seat assembly of claim 13, wherein the second seat back includes a second seat back frame and a second seat back panel including a second seat back panel upper section and a second seat back panel lower section; and the second seat back panel upper section and the second seat back panel lower section are rigidly coupled to the second seat back frame.

15. The seat assembly of claim 14, wherein the second seat back panel upper section and the second seat back panel lower section are bolted to the second seat back frame.

16. A vehicle, comprising:

a mounting surface;

a rear wall rotatably coupled to the mounting surface and movable between a rear wall seating position and a rear wall cargo position, the rear wall partially defining a vehicle cabin and cargo bed in the rear wall seating position; and a seat assembly coupled to the mounting surface, the seat assembly comprising:

a seat frame, and a seat back coupled to the seat frame comprising:

a seat back frame, and a back panel comprising:

an upper section rigidly coupled to the seat back frame; and a lower section coupled to the seat back frame via a plurality of fasteners, the plurality of fasteners configured to deform and disengage from the seat back frame.

17. The vehicle of claim 16, wherein, with the rear wall in the rear wall cargo position, the rear wall is disposed on the back panel.

18. The vehicle of claim 17, further comprising:

a first side wall extending from the mounting surface;

a second side wall extending from the mounting surface;

a first seat belt assembly coupled to the first side wall;

a second seat belt assembly including a first portion coupled to a top section of the seat back frame; and a third seat belt assembly coupled to the second side wall.

19. The vehicle of claim 18, wherein the plurality of fasteners comprises a plurality of plastic fasteners configured to disengage at least one of the back panel or the seat back frame when a force applied to the seat back frame, at least in part via the first portion of the second seat belt assembly, exceeds a threshold.

20. The vehicle of claim 19, wherein the seat assembly further comprises a first seat base comprising a first base seating section and a second base seating section and the seat back is a first seat back comprising a first back seating section and a second back seating section, wherein the first base seating section and the first back seating section define a first seat and the second base seating section and the second back seating section at least partially define a second seat; and the force applied to the seat back frame via the first portion of the second seat belt assembly corresponds to a mass of an occupant of the second seat.

* * * * *